(12) United States Patent
Wu

(10) Patent No.: US 7,287,543 B2
(45) Date of Patent: Oct. 30, 2007

(54) HYDRAULIC DEVICE

(76) Inventor: Ching-Chuan Wu, No. 61, Chang Chiang St., Chiang Pei Li, Hsi Chih City, Taipei Hsien (TW)

( * ) Notice: Subject to any disclaimer, the term of this patent is extended or adjusted under 35 U.S.C. 154(b) by 8 days.

(21) Appl. No.: 11/370,927

(22) Filed: Mar. 9, 2006

(65) Prior Publication Data

US 2007/0209706 A1    Sep. 13, 2007

(51) Int. Cl.
  *G05D 16/00*    (2006.01)
(52) U.S. Cl. ............... 137/209; 137/255; 137/256; 220/723
(58) Field of Classification Search ........... 137/209, 137/255, 256, 223; 220/723
  See application file for complete search history.

(56) References Cited

U.S. PATENT DOCUMENTS 1,690,072 A * 10/1928 Johnson ................. 220/721
5,979,481 A * 11/1999 Ayresman ................ 137/14
6,527,002 B1 * 3/2003 Szakaly .................. 137/14
6,681,789 B1 * 1/2004 Moulis et al. ............ 137/14
7,168,442 B1 * 1/2007 McRobert ............... 137/209

* cited by examiner

Primary Examiner—Kevin Lee
(74) Attorney, Agent, or Firm—Leong C. Lei

(57) ABSTRACT

A hydraulic device is provided herein. The hydraulic device mainly contains a reservoir having an airbag inside. The reservoir is provided with an inlet pipe and a plurality of outlet pipes, both extended from a top side of the reservoir. The inlet pipe receives water from a pumper and fills the reservoir via a back-pressure valve. The airbag expands by the air driven by an air compressor to force water from the reservoir into the outlet pipes. When the water level of the inlet pipe is higher than that of the outlet pipes, due to the siphon principle, water will continuously flows from the inlet pipe, through the vacuumed reservoir, into and then out of the outlet pipes. The water poured out of the outlet pipes can be utilized for hydroelectricity or irrigation.

1 Claim, 3 Drawing Sheets

HYDRAULIC DEVICE

BACKGROUND OF THE INVENTION (a) Technical Field of the Invention

The present invention generally relates to hydraulic devices, and more particularly to a hydraulic device based on the siphon principle for hydroelectricity and irrigation.

(b) Description of the Prior Art

Clean and efficient power generation is the most critical challenge in the new millennium as the earth's natural resources are gradually depleted. Thermal power generation by burning fossil fuel is well known to be one of the major causes to acid rain, greenhouse effect, all sorts of air and water pollutions, and damage to the ozone layer, just to name a few. Nuclear power generation, on the other hand, is notorious about its radioactive waste whose disposal is extremely difficult, if not impossible, to solve.

Wind and hydraulic power generations are the two most environmentally friendly approaches. Wind power is unlimited to harness but the direction and strength of the natural wind are not human-controllable, and the production cost is relatively high compared to the conventional power generation methods.

Hydraulic approach is the most common, feasible, and green method of power generation. However, the production cost is rather high as usually a dam has to be built and maintained.

SUMMARY OF THE INVENTION

The primary purpose of the present invention is to provides a hydraulic device for the generation of hydroelectricity and for irrigation, which is both inexpensive and environmentally friendly.

The present invention mainly contains a reservoir having an airbag inside. The reservoir is provided with an inlet pipe and a plurality of outlet pipes, both extended from a top side of the reservoir. The inlet pipe receives water from a pumper and fills the reservoir via a back-pressure valve. The airbag expands by the air driven by an air compressor to force water from the reservoir into the outlet pipes. When the water level of the inlet pipe is higher than that of the outlet pipes, due to the siphon principle, water will continuously flows from the inlet pipe, through the vacuumed reservoir, into and then out of the outlet pipes. The water poured out of the outlet pipes is at a certain height and therefore can be utilized for hydroelectricity or irrigation.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
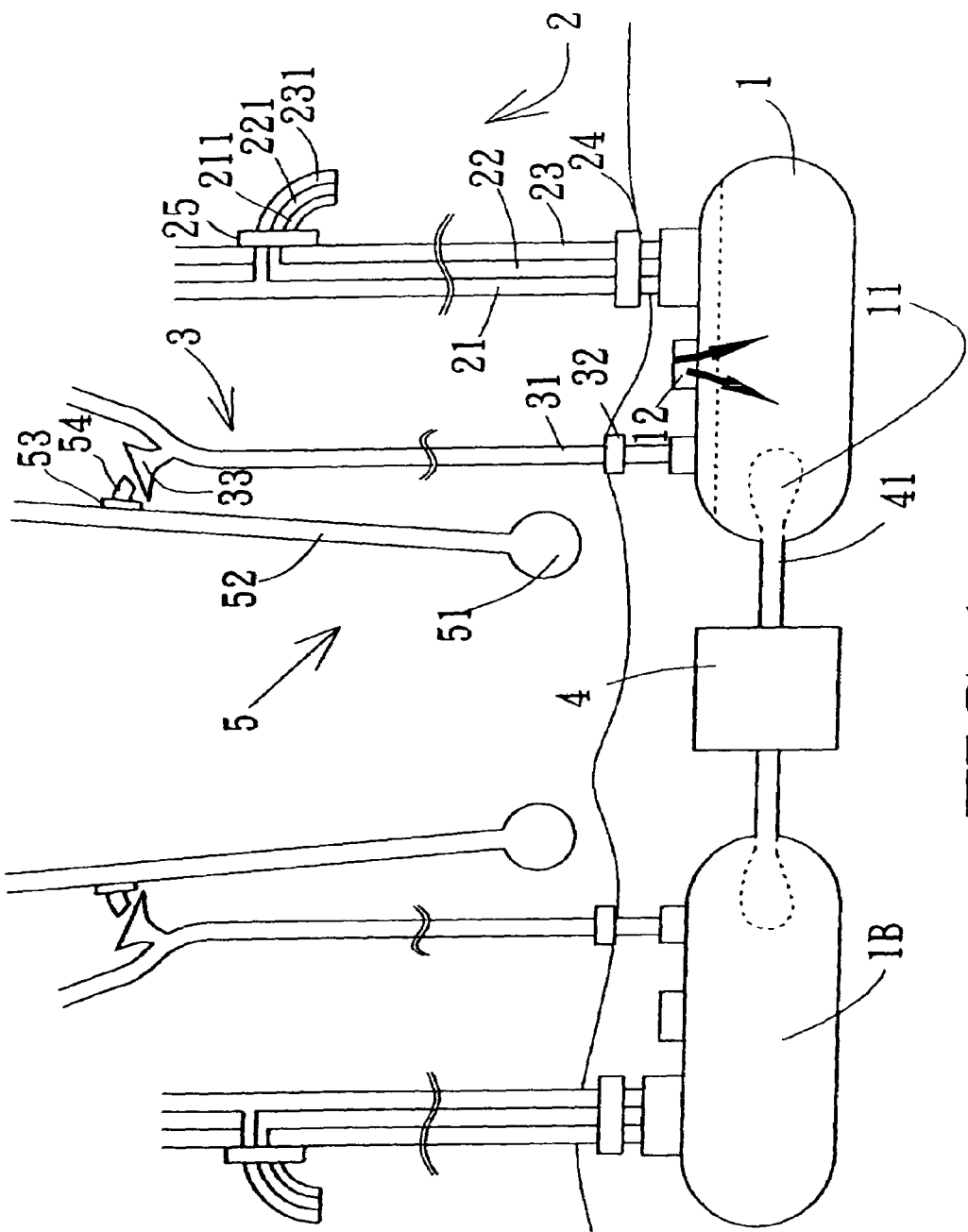
FIG. 1 is a schematic diagram showing a hydraulic device according to an embodiment of the present invention.

As shown in FIG. 1, an embodiment of the present invention mainly contains an air compressor 4 and two identical assemblies. Each assembly contains a reservoir 1, an outlet pipe group 2, an inlet pipe 31, and a pumper 5. Inside the reservoir 1, there is an airbag 11 connecting to and receiving air from the air compressor 4 via an air pipe 41. The outlet pipe group 2 and the inlet pipe 31 are provided substantially perpendicularly on a top side of the reservoir 1. Also on the top side of the reservoir 1, there is a back-pressure valve 12 allowing water to flow into the reservoir 1 under appropriate pressure. The outlet pipe group 2 contains at least two outlet pipes and, in the present embodiment, three outlet pipes 21, 22, and 23 are provided, each of which has a back-pressure valve 24 configured at the junction to the reservoir 1, allowing water to flow from the reservoir 1 into the outlet pipes 21, 22, and 23 under appropriate pressure. The outlet pipes 21, 22, 23 are branched with branch pipes 211, 221, 231, respectively at appropriate locations along their elongated tubular bodies with back-pressure valves 25 at the junctions, allowing water to flow from the outlet pipes 21, 22, 23 into the branch pipes 211, 221, 231 under appropriate pressure. The inlet pipe 31 has a back-pressure valve 32 at the junction to the reservoir 1 and a collection pipe 33 branched from an appropriate location along the inlet pipe 31 elongated tubular body. In the present embodiment, the collection pipe 33 is shaped like a funnel. The pumper 5 has a pressurizing motor 51 and an outlet pipe 52 extended from the motor 51 towards the top. A branch pipe 54 is branched from an appropriate location along the tubular body of the outlet pipe 52 with a back-pressure valve 53 at the junction, allowing water to flow from the outlet pipe 52 into the branch pipe 54. The branch pipe 54 and the collection pipe 33 are provided such that water poured from the branch pipe 54 is directed into the collection pipe 33. As shown in FIG. 1, the two assemblies are provided at the two sides of the air compressor 4, so that the air compressor 4 is able to draw air from one airbag to fill the other, and vice versa. During the operation of the present embodiment, the two assemblies are engaged alternately.

Figure 2:
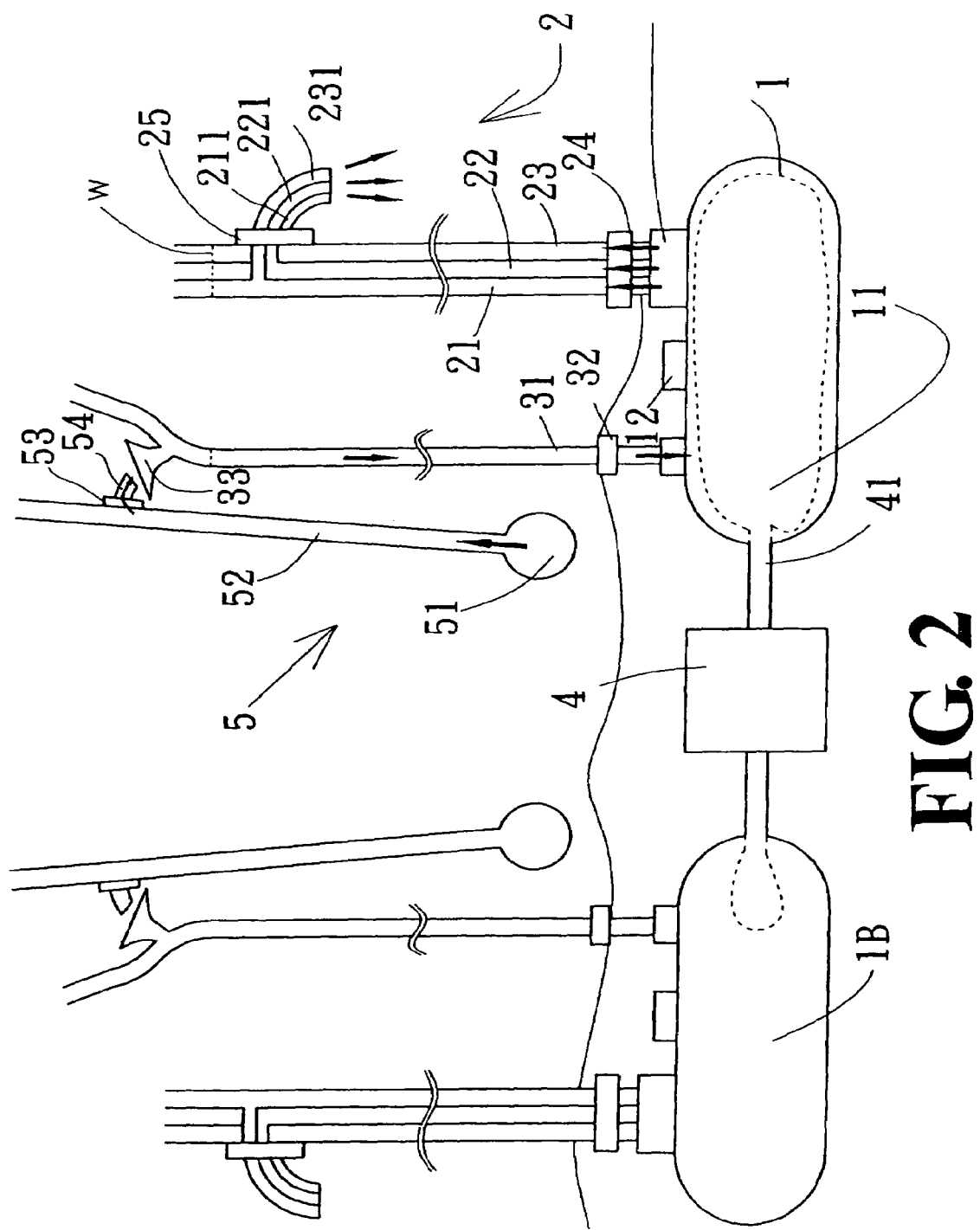
FIG. 2 is a schematic diagram showing a scenario of the operation of the hydraulic device of FIG. 1

When the present embodiment is put to use, the reservoirs 1 and 1B of the two assemblies are positioned below water level. For simplicity, only the operation of the assembly having the reservoir 1 is described. The back-pressure valve 12 is opened under the water pressure and the reservoir 1 is therefore filled with water. When the reservoir 1 is full with water, the air compressor 4 is engaged to drive air into the airbag 11 via the air pipe 41, as shown in FIG. 2. Therefore, as the airbag 11 expands, the water inside the reservoir 1 is pressured to open the back-pressure valves 24 and flows into the outlet pipes 21, 22, and 23. When the water level of the outlet pipes 21, 22, and 23 has reached an appropriate height (W) above the back-pressure valves 25 and the water pressure is large enough to open the back-pressure valves 25, water is poured from the branch pipes 211, 221, and 231. As the branch pipes 211, 221, and 231 have an appropriate height above the ground, the water poured from them can be harnessed for hydroelectricity or irrigation.

In the mean time, the pressurizing motor 51 is also engaged to draw water into the outlet pipe 52 of the pumper 5. Similarly, when the water level of the outlet pipe 52 has reached an appropriate height above the back-pressure valve 53, the back-pressure valve 53 is opened and water is poured from the branch pipe 54 into the collection pipe 33 and then into the inlet pipe 31. When the water level inside the inlet pipe 31 is above the height (W), due to the siphon principle, the water inside the inlet pipe 31 opens the back-pressure valve 32 and flows through the reservoir 1 and then into the outlet pipes 21, 22, and 23. Again, as the water inside the outlet pipes 21, 22, and 23 accumulate to the height (W), the water pours out of the branch pipes 211, 221, and 231. The foregoing process will run continuously as describe and water will thereby continuously flow out of the branch pipes 211, 221, and 231.

Figure 3:
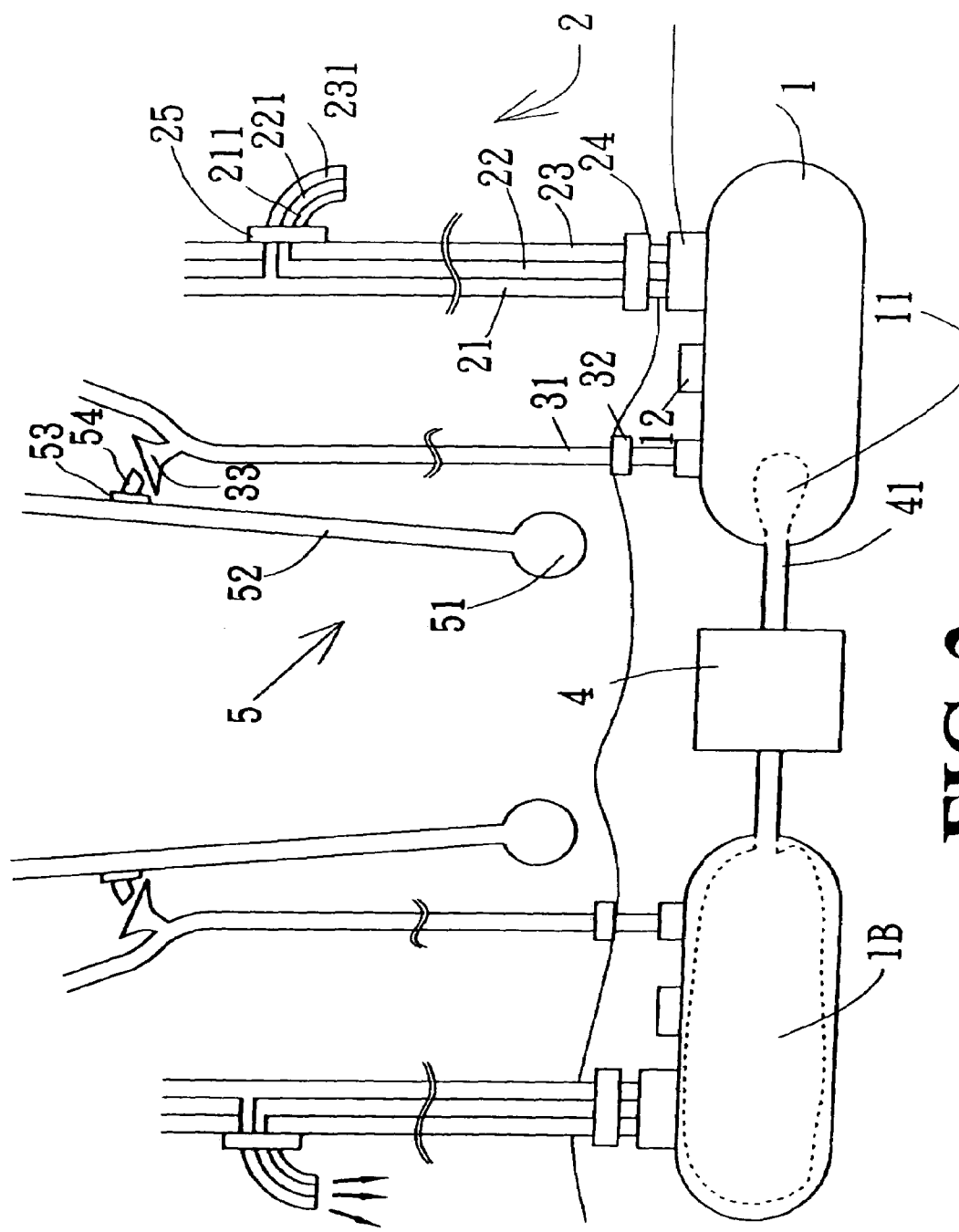
FIG. 3 is a schematic diagram showing another scenario of the operation of the hydraulic device of FIG. 1.

When the airbag 11 expands to the maximum, the air compressor 4 will reverse its direction and drive air into the airbag inside the reservoir 1B from the airbag 11, as shown in FIG. 3. As the airbag 11 gradually shrinks, the inlet pipe 31 and the pumper 5 will continue to work and water will continue to flow out of the branch pipes 211, 221, and 231 for a period of time until the set of components having the reservoir 1B starts to provide water from its outlet pipes. The function of the set of components having the reservoir 1B is identical to that having the reservoir 1, and the operation scenarios are therefore omitted here for simplicity. In this way, the two assemblies are engaged alternately to provide water continuously and, therefore, non-stop hydroelectricity production and irrigation are achieved.

The inlet pipe 31 can be implemented using a thin pipe having 2 cm in diameter up to 400 m high. The electricity for powering the pressurizing motor 51 and the air compressor 4 can be drawn from a wind-driven power generator so that the present embodiment does not consume any energy resources and is completely friendly to the environment.

The outlet pipe group 2 can be extended inland for remote irrigation and watering.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A hydraulic device, comprising an air compressor, a first assembly, a second assembly identical to said first assembly, each of said first and second assemblies having:

a reservoir having an air bag inside and a back-pressure valve on a top side of said reservoir that allows water to flow into said reservoir under appropriate pressure, said air bag connected to said air compressor via an air pipe;

a plurality of outlet pipes extended substantially perpendicularly from said top side of said reservoir, each of said outlet pipes having a back-pressure valve at the junction to said reservoir allowing water to flow from said reservoir into said outlet pipes under appropriate pressure, each of said outlet pipes branched with a branch pipe at an appropriate location along said outlet pipe having a back-pressure valve at the junction to said outlet pipe allowing water to flow from said outlet pipe to said branch pipe under appropriate pressure;

an inlet pipe extended substantially perpendicularly from said top side of said reservoir having a back-pressure valve at the junction to said reservoir allowing water to flow from said inlet pipe to said reservoir under appropriate pressure, said inlet pipe branched with a collection pipe at an appropriate location along said inlet pipe; and a pumper having an pressurizing motor and an outlet pipe extended from said pressurizing motor towards the top, said outlet pipe branched with a branch pipe at an appropriate location along said outlet pipe having a back-pressure valve at the junction to said branch pipe allowing water to flow from said outlet pipe to said branch pipe under appropriate pressure, said branch pipe and said collection pipe being configured so as to pour water from said branch pipe into said collection pipe;

wherein, during the operation of said hydraulic device, said reservoirs of said first and second assemblies are positioned below water level; said back-pressure valve of said reservoir is opened to fill said reservoir with water, said air compressor is engaged to drive air into said airbag of said first assembly when said reservoir of said first assembly is full with water; water is forced into said outlet pipes as said airbag expands until the water level of said outlet pipes is above said back-pressure valves of said branch pipes at appropriate height; water then flows out of said branch pipes for harness; said pressurizing motor is engaged to draw water into said outlet pipe of said pumper until the water level of said outlet pipe of said pumper has reached an appropriate height above said back-pressure valve of said branch pipe of said pumper, water then flows out of said branch pipe of said pumper into said collection pipe of said inlet pipe; water then flows from said inlet pipe into said outlet pipes when the water level of said inlet pipe is above the water level of said outlet pipes; said second assembly is engaged when said airbag of said first assembly expands to the maximum and said air compressor draws air from said airbag of said first assembly into said airbag of said second assembly; and said first and second assemblies are engaged alternately as described above so that water continuously flows out from said branch pipes of said outlet pipes for harness.

* * * * *